Nov. 2, 1954
H. A. STORCH
2,693,153
LOADING MECHANISM
Filed July 1, 1948
11 Sheets-Sheet 3
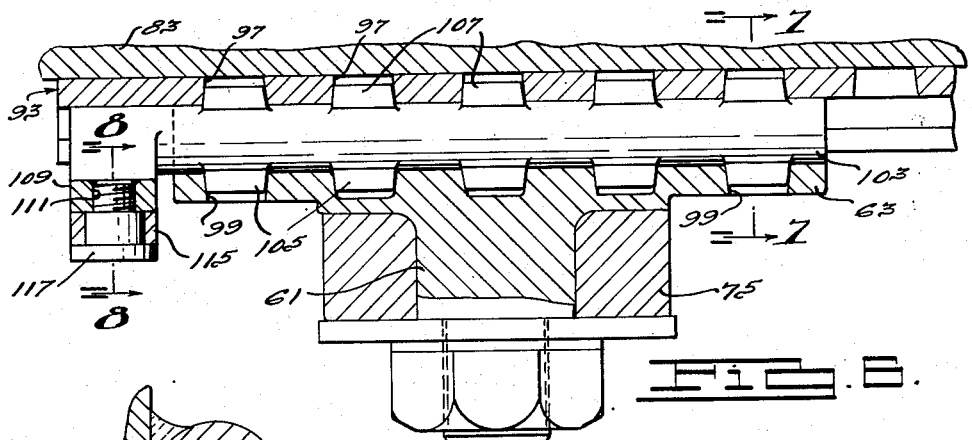
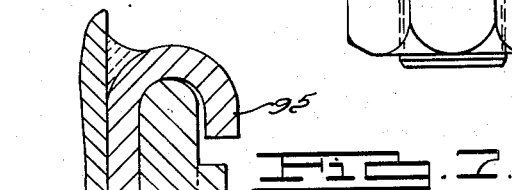
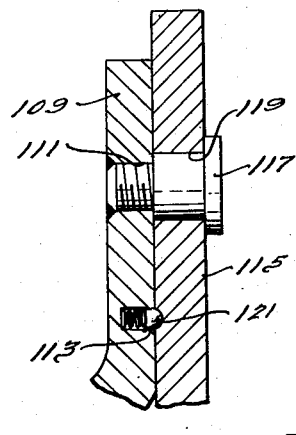
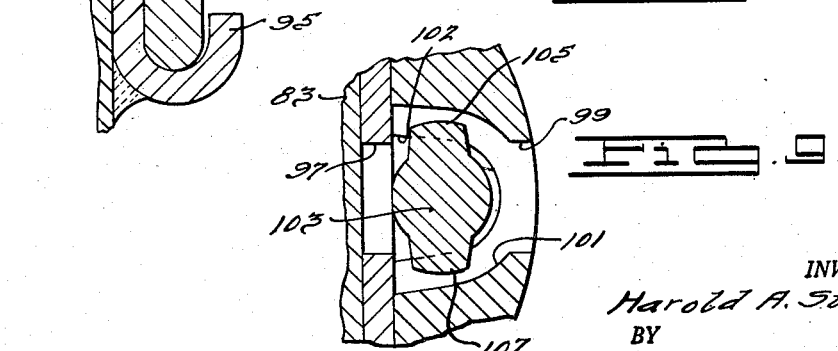
INVENTOR.
Harold A. Storch
BY
Harness, Dickey & Pierce
ATTORNEYS.

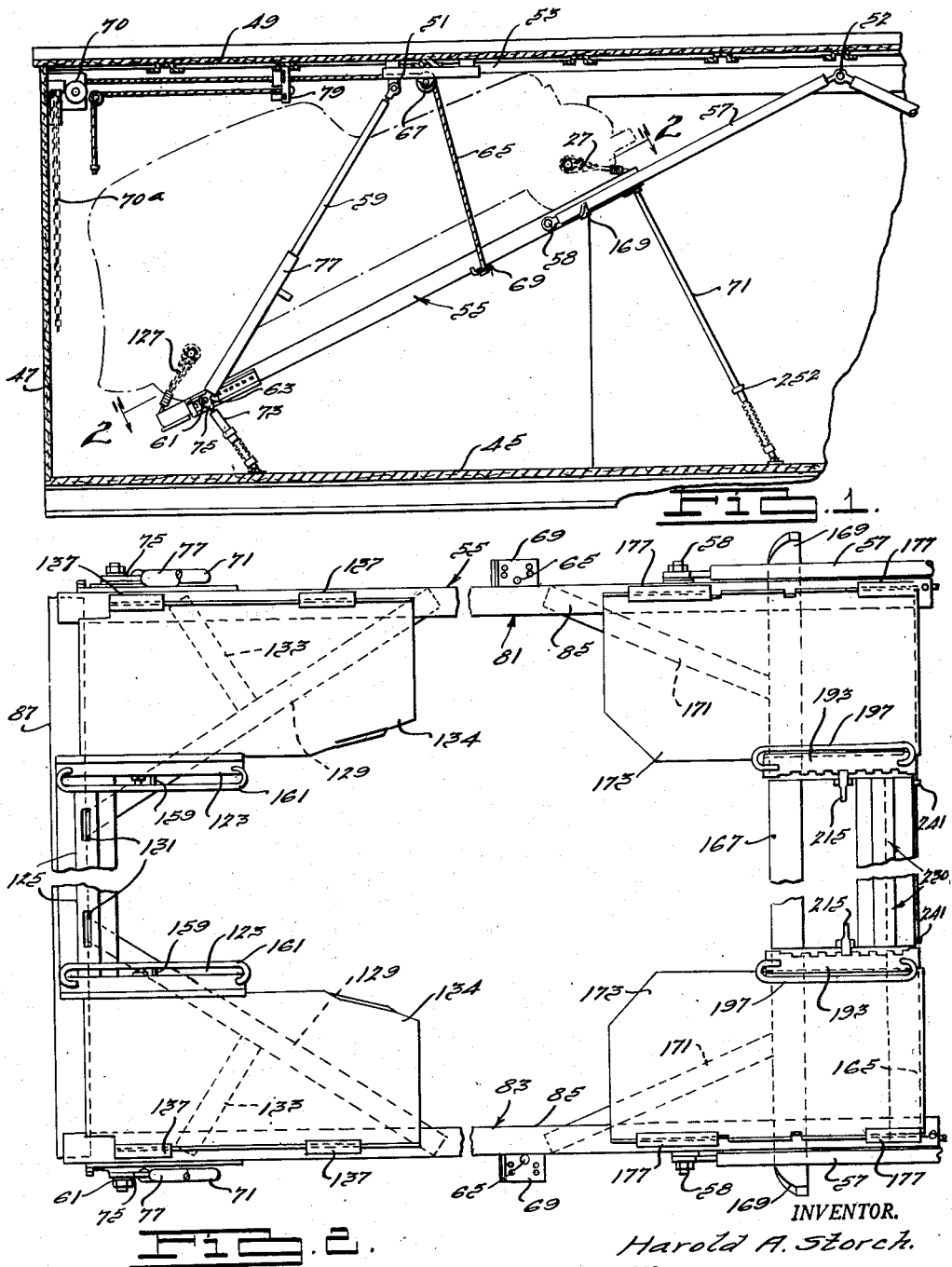

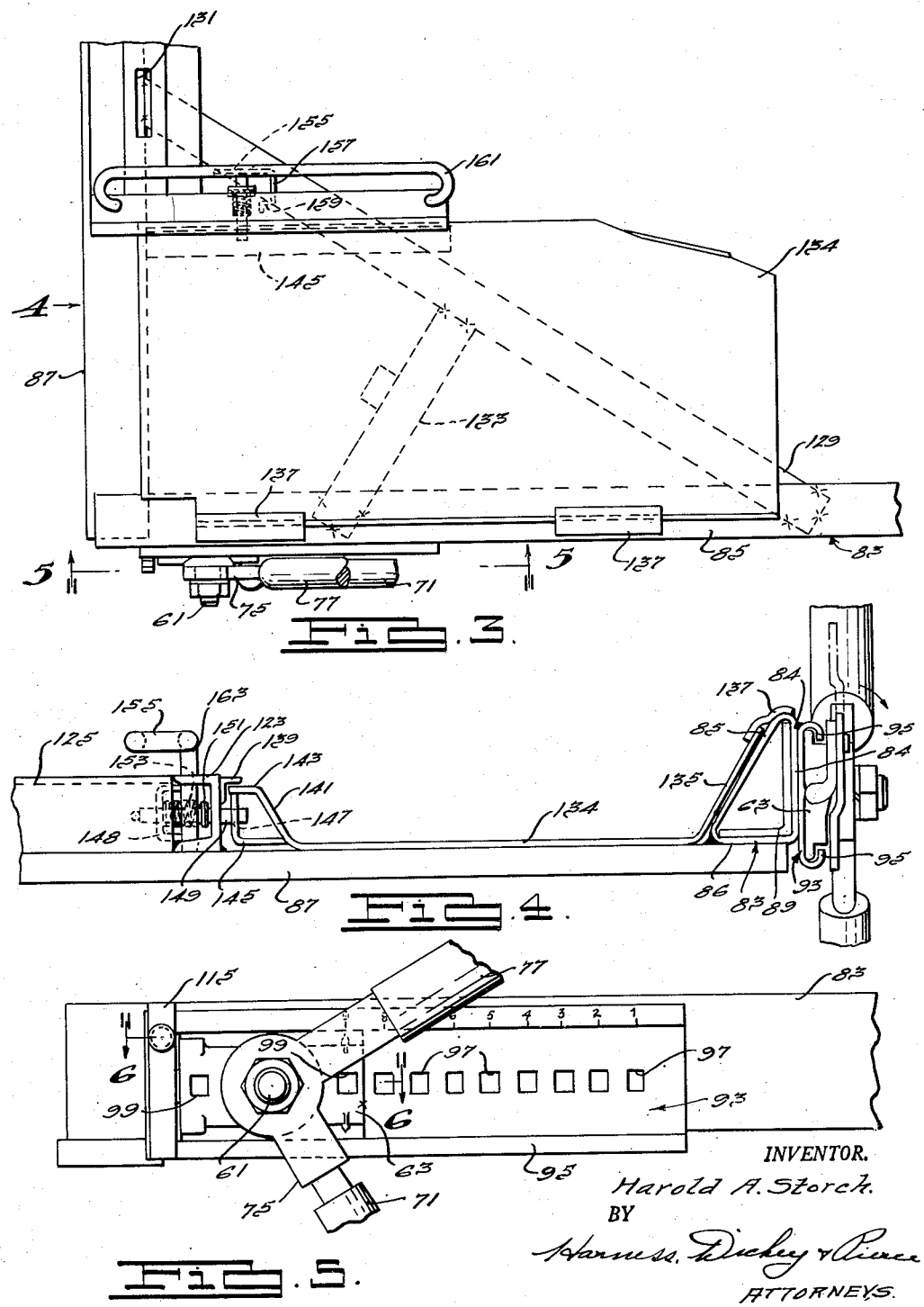

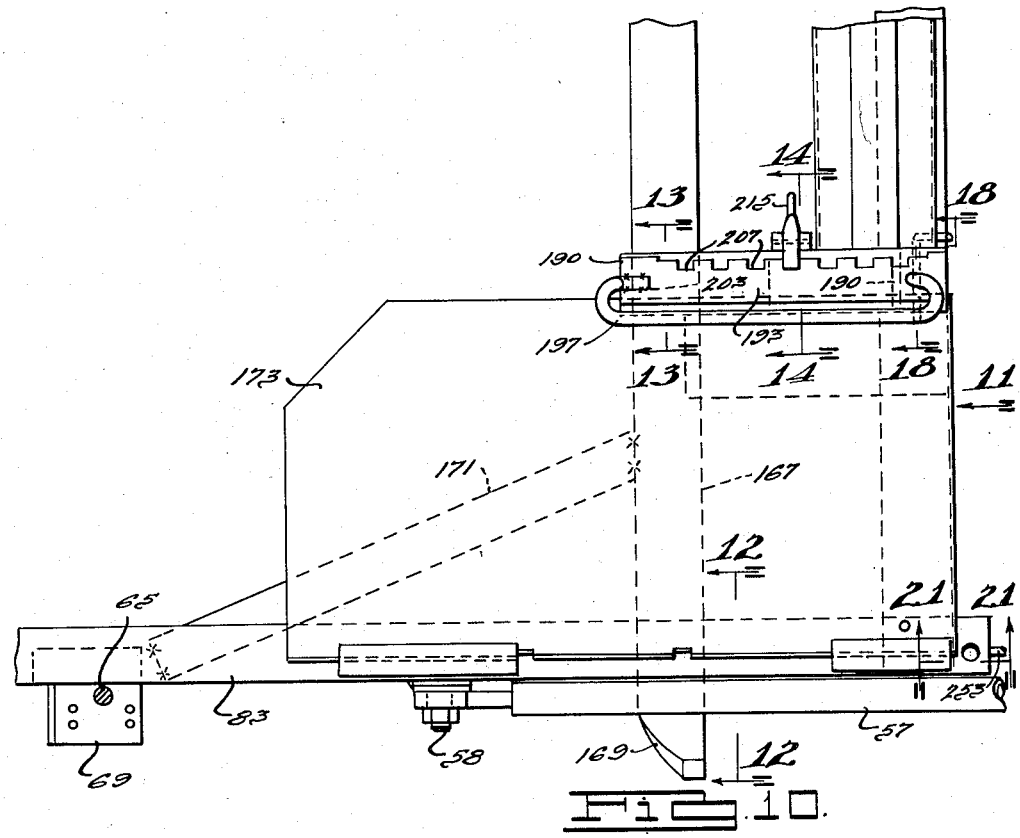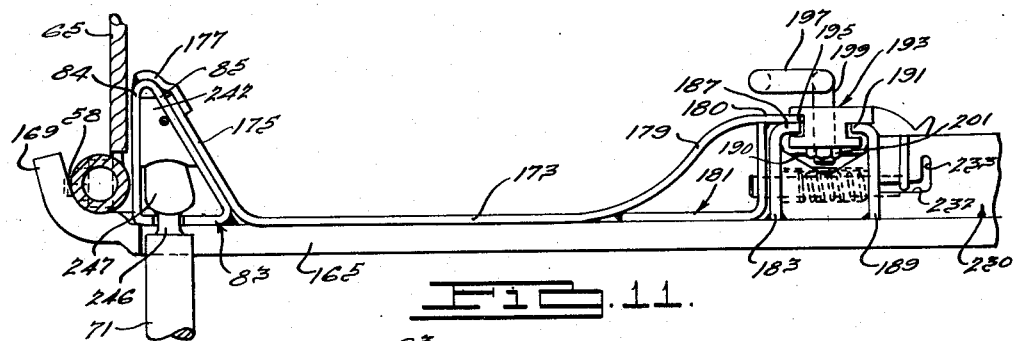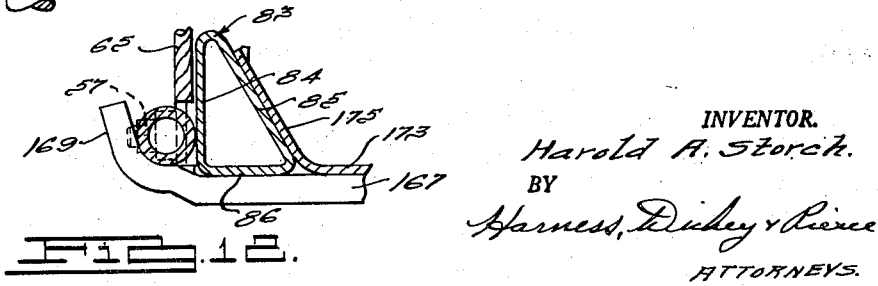

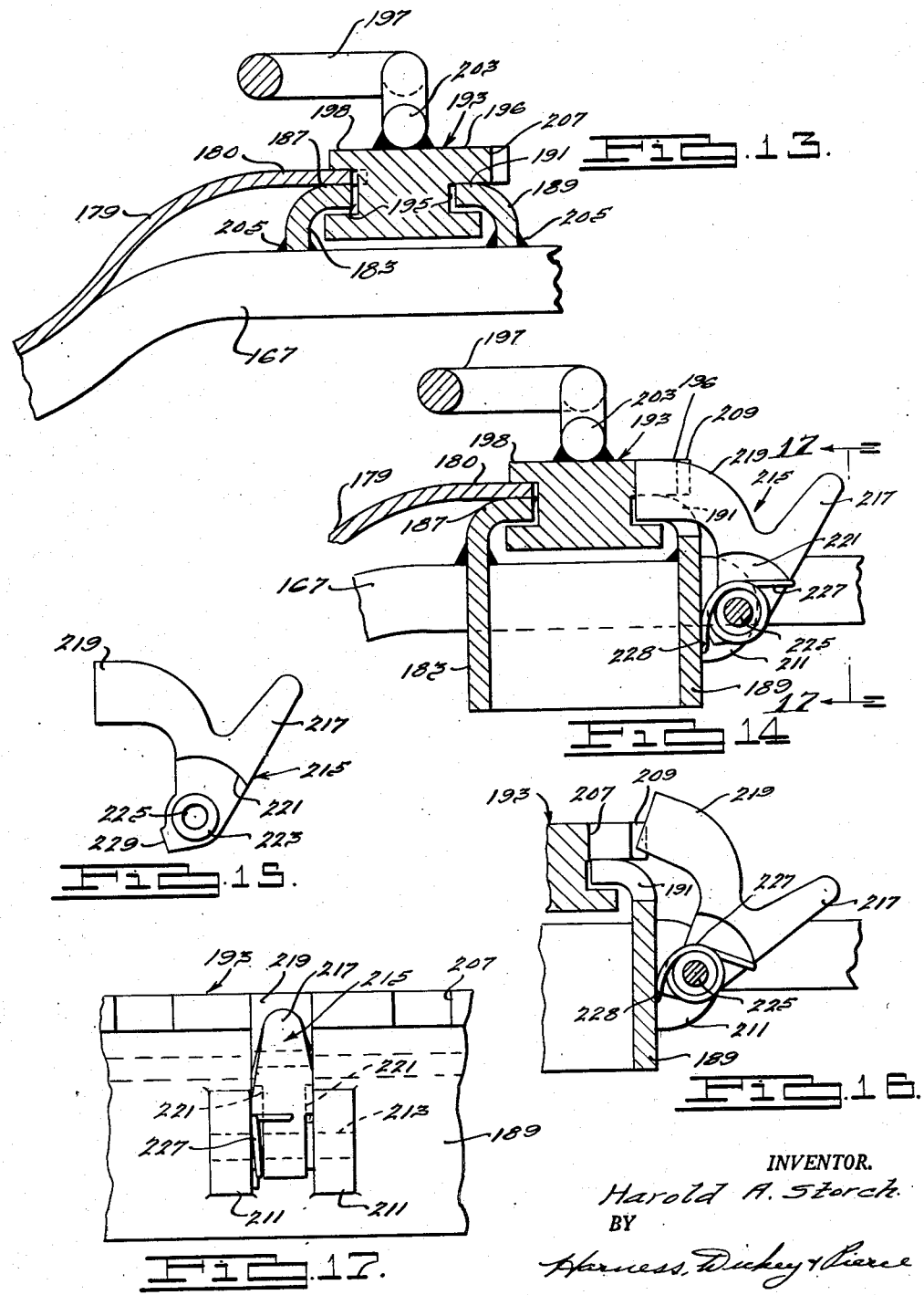

Nov. 2, 1954 H. A. STORCH 2,693,153
LOADING MECHANISM
Filed July 1, 1948 11 Sheets-Sheet 6
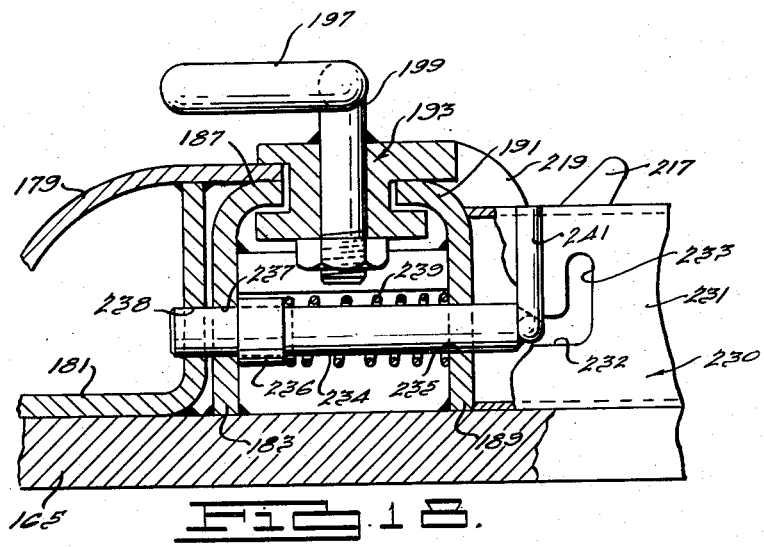
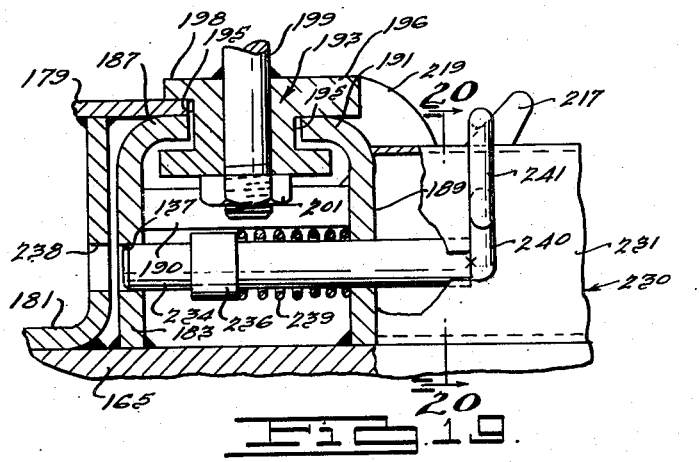
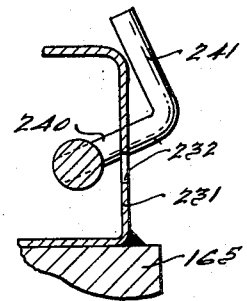
INVENTOR.
Harold A. Storch.
BY
Harness, Dickey & Pierce.
ATTORNEYS.

Nov. 2, 1954 H. A. STORCH 2,693,153
LOADING MECHANISM
Filed July 1, 1948 11 Sheets-Sheet 7
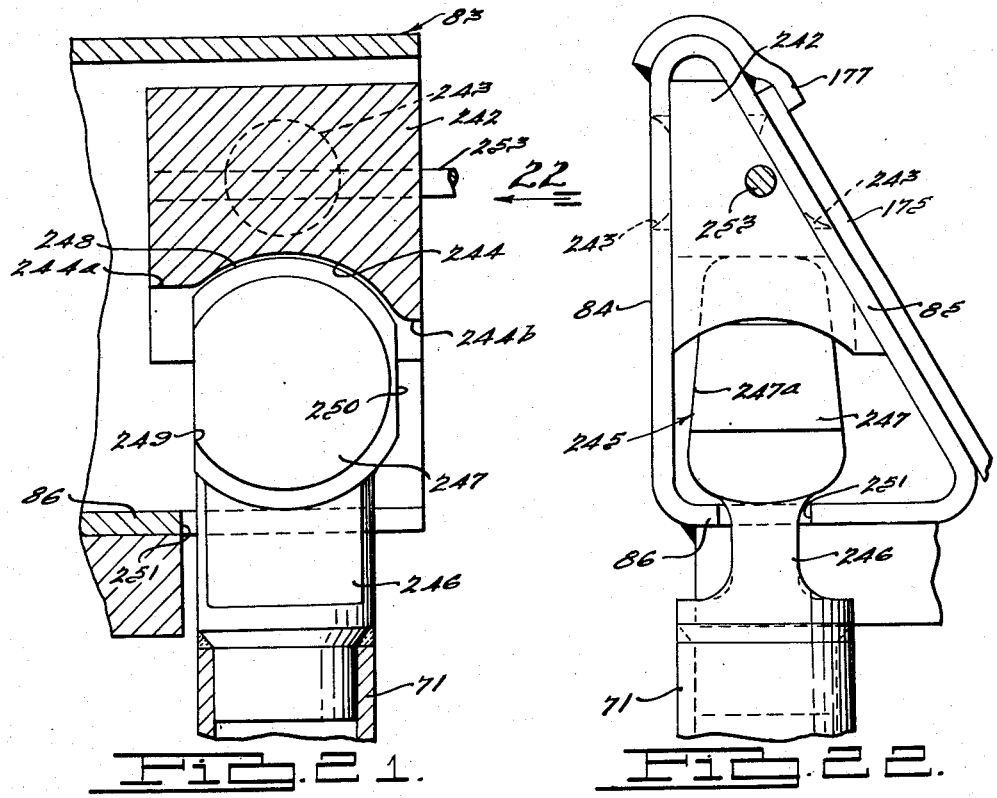
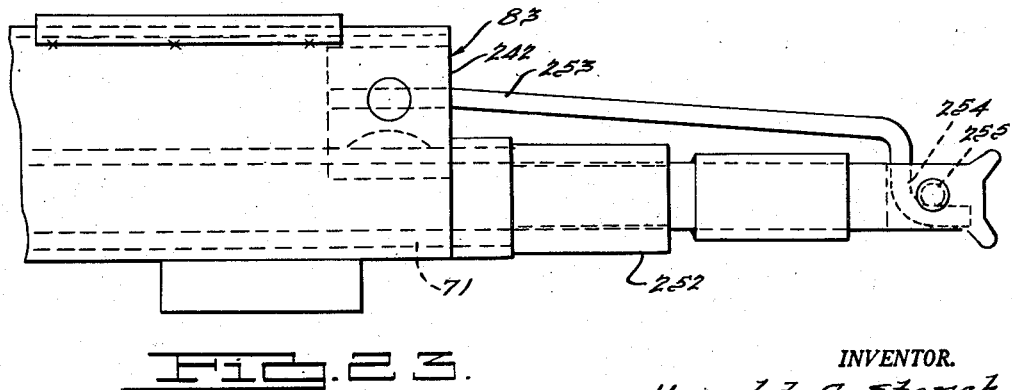
INVENTOR.
Harold A. Storch.
BY
Harness, Dickey & Pierce.
ATTORNEYS.

Nov. 2, 1954　　　　H. A. STORCH　　　　2,693,153
LOADING MECHANISM
Filed July 1, 1948　　　　　　　　　　　　11 Sheets-Sheet 8

INVENTOR.
Harold A. Storch.
BY
Harness, Dickey & Pierce
ATTORNEYS.

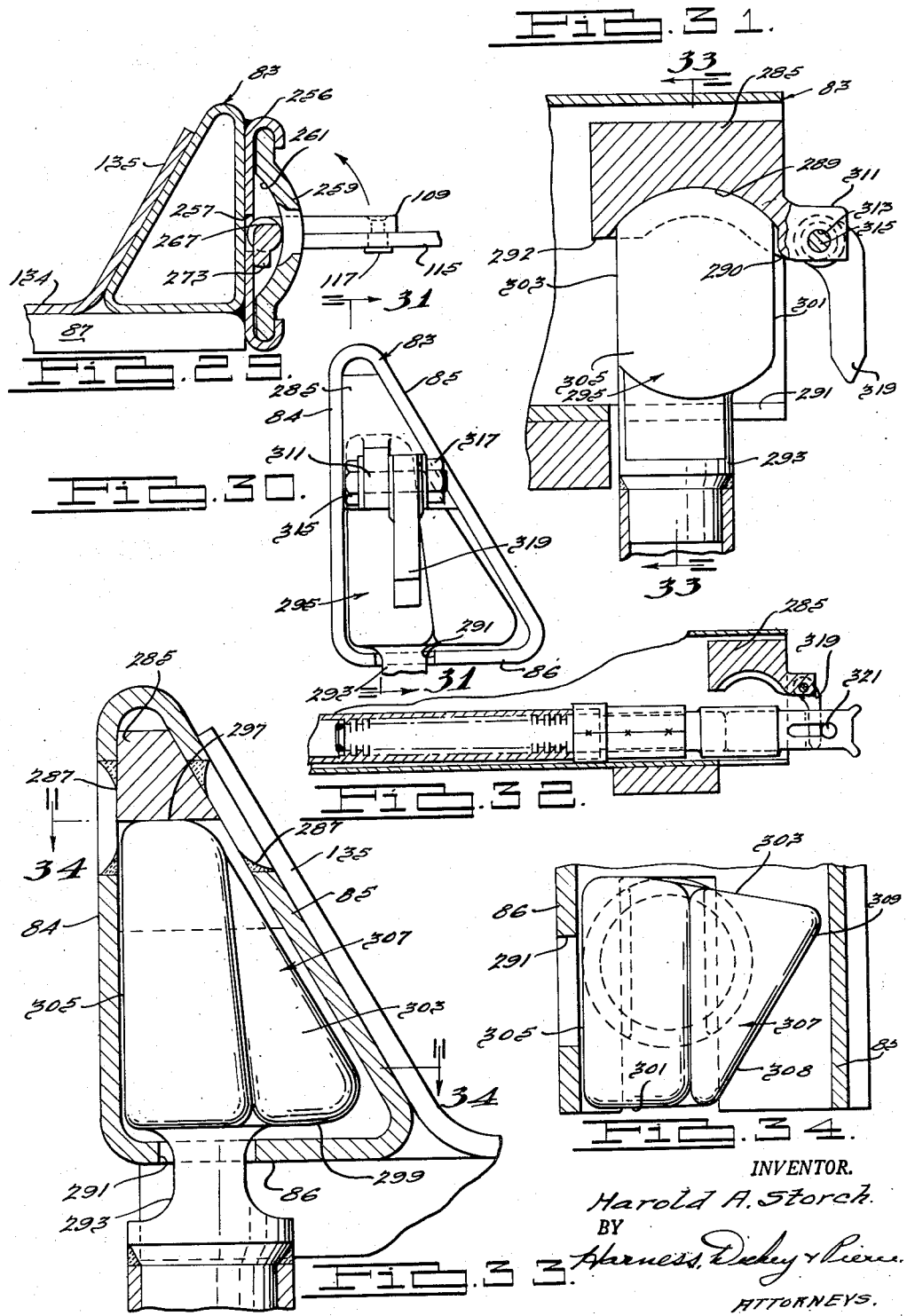

Nov. 2, 1954   H. A. STORCH   2,693,153
LOADING MECHANISM
Filed July 1, 1948   11 Sheets-Sheet 10

INVENTOR.
Harold A. Storch.
BY
Harness, Dickey & Pierce
ATTORNEYS.

Nov. 2, 1954     H. A. STORCH     2,693,153
LOADING MECHANISM
Filed July 1, 1948     11 Sheets-Sheet 11
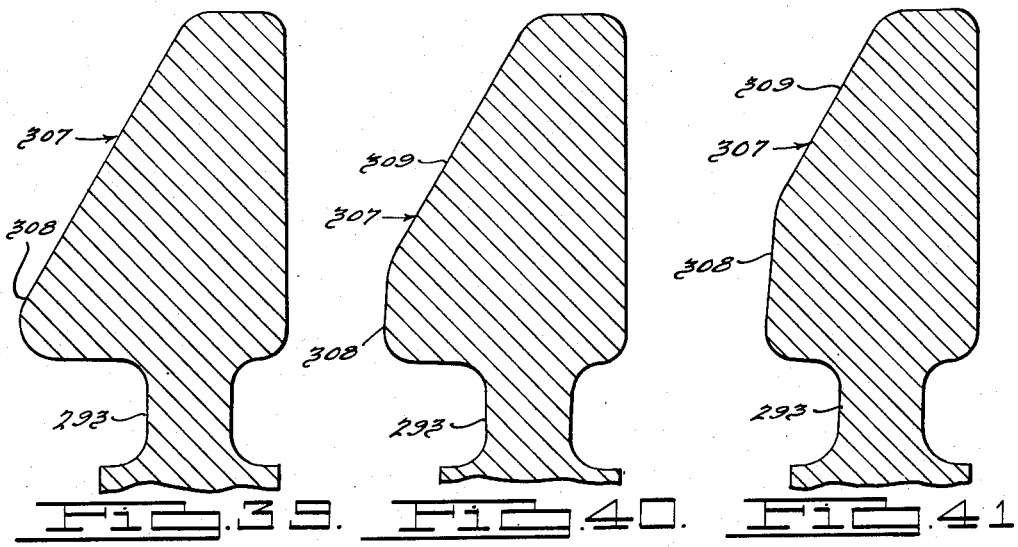
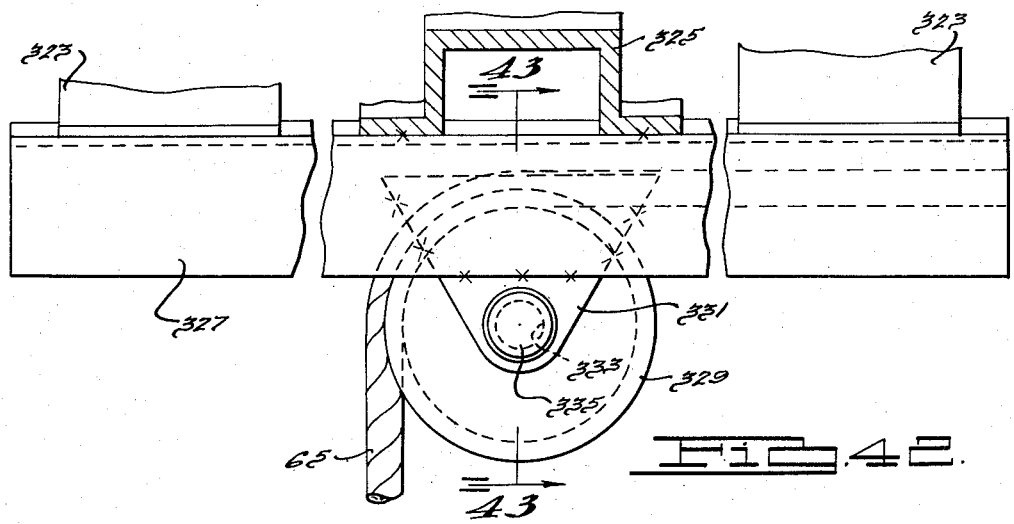
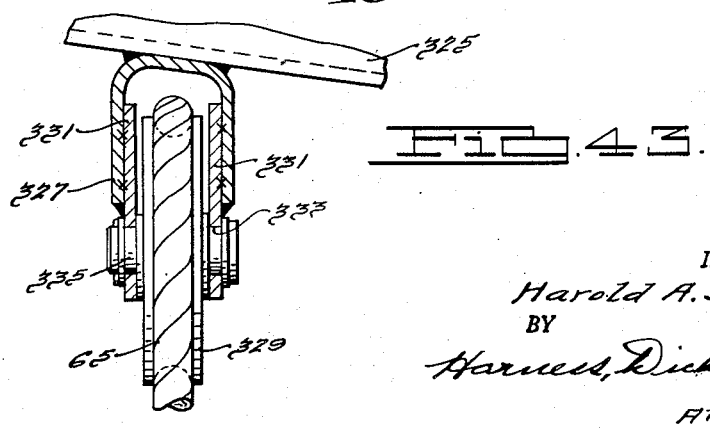
INVENTOR.
Harold A. Storch.
BY
Harness, Dickey & Pierce
ATTORNEYS.

United States Patent Office 2,693,153
Patented Nov. 2, 1954

2,693,153
LOADING MECHANISM

Harold A. Storch, Pontiac, Mich., assignor to Evans Products Company, Plymouth, Mich., a corporation of Delaware Application July 1, 1948, Serial No. 36,551

11 Claims. (Cl. 105—368)

This invention relates to a car loading device and has particular relation to a mechanism for disposing an automobile in a semidecking position for transportation purposes.

The invention concerns certain adjustable features of frames that are used to stow automobiles in freight cars. The frames are rectangular in shape and at their rear ends are supported from the roofs of freight cars by means of telescopic rods. The bottom ends of the rods are pivoted on trunnions that extend from slide plates which are slidably carried by guide elements that are fixed on the sides of the frame. Each slide plate and thus each trunnion can be adjusted lengthwise of the frame on the guide elements and this permits adjustment of the lower ends of the telescopic rods. Such adjustment permits the angle at which the frame is used to be varied and enables the frames to accommodate different sizes of automobiles so that optimum use of the space within the freight car will be obtained. In order to lock the slide plates in various adjusted positions they are provided with a series of longitudinally spaced locking apertures and these may register with a series of similar locking recesses in the fixed guide elements on the frame. In preferred arrangement, a lock shaft is placed between the slide plates and the guide elements and carries locking lugs that simultaneously will engage apertures in the slide plate and the guide element to lock the slide plate in fixed position. The lock shaft can be rotated to remove the lugs from the apertures and permit adjustment of the slide plate and rod trunnion.

The principal objects of this invention are to provide a new and improved type of automobile loading frame which is light in weight, economical to manufacture, simple in construction and more easily mounted and adapted for use in a freight car; to provide a frame having closed section side rails which will give added strength and rigidity to the frame; to provide a frame having closed section side rails which have sloping sides to guide the wheels of an automobile which is loaded thereon even before it reaches the wheel pans; to provide a novel and improved type of sliding hub for securing to the frame the arms which adjustably connect said frame to the freight car; to provide improved type locks for adjustable wheel pans and chain bars so that the aforementioned adjustable parts can be adjusted by one man; to provide an improved type frame in which the supporting struts therefor on at least one end thereof may be stowed in the frame when the latter is not in use so as not to project therefrom and interfere with storage of said frame within a freight car; to provide a novel type ball and socket connection between the aforementioned struts and frame which will allow said legs to be completely stowed within said frame; to provide a novel and improved type sheave and hanger therefor; to provide generally an improved type frame having various improved and novel features thereon.

These and other objects of this invention will become apparent from the following detailed description taken in conjunction with the accompanying drawings in which:

Figure 1 is a side-elevational view of the frame of this invention, shown in a semidecking position within a freight car;

Fig. 2 is a broken plan view of the frame taken along the line 2—2 of Fig. 1;

Fig. 3 is a partial enlarged plan view of a portion of the rear end of the frame structure illustrated in Fig. 2;

Fig. 4 is an end elevational view of the structure illustrated in Fig. 3 taken in the direction of the arrow 4 on Fig. 3;

Fig. 5 is a view in elevation taken along the line 5—5 of Fig. 3;

Fig. 6 is a sectional view taken along the line 6—6 of Fig. 5;

Fig. 7 is a sectional view taken along the line 7—7 of Fig. 6;

Fig. 8 is a sectional view taken along the line 8—8 of Fig. 6;

Fig. 9 is a sectional view of the structure shown in Fig. 7 with the lock shaft rotated 90° from that shown in Fig. 7;

Fig. 10 is an enlarged partial plan view of a portion of the front end of the frame structure illustrated in Fig. 2;

Fig. 11 is an end elevational view taken in the direction of the arrow 11 on Fig. 10;

Fig. 12 is a sectional view taken along the line 12—12 of Fig. 10;

Fig. 13 is a sectional view taken along the line 13—13 of Fig. 10;

Fig. 14 is a sectional view taken along the line 14—14 of Fig. 10;

Fig. 15 is a side-elevational view of a detail of the lock mechanism shown in Fig. 14;

Fig. 16 is a partial sectional view of the structure illustrated in Fig. 14, showing the mechanism in an unlocked position;

Fig. 17 is an elevational view taken along the line 17—17 of Fig. 14;

Fig. 18 is an enlarged sectional view taken along the line 18—18 of Fig. 10;

Fig. 19 is a sectional view of the structure illustrated in Fig. 18 with the lock mechanism retracted from the position shown in Fig. 18;

Fig. 20 is a sectional view taken along the line 20—20 of Fig. 19;

Fig. 21 is a sectional view taken along the line 21—21 of Fig. 10;

Fig. 22 is a front elevational view of the structure shown in Fig. 21 taken in the direction of the arrow 22 thereof;

Fig. 23 is a side-elevational view of the structure shown in Fig. 22, with the leg rotated into the plane of the side rail and of the frame stowed therein;

Fig. 29 is sectional view of the structure shown in Fig. 28, with the lock mechanism rotated 90° from that shown in Fig. 28;

Fig. 30 is an end elevational view of a further embodiment of the invention;

Fig. 31 is a sectional view taken along the line 31—31 of Fig. 30;

Fig. 32 is a reduced sectional view of the structure shown in Fig. 31, with the leg thereof rotated 90° and stored within the frame side rail;

Fig. 33 is a sectional view taken along the line 33—33 of Fig. 31;

Fig. 34 is a sectional view taken along the line 34—34 of Fig. 33;

Fig. 39 is a sectional view taken along the line 39—39 of Fig. 35;

Fig. 40 is a sectional view taken along the line 40—40 of Fig. 35;

Fig. 41 is a sectional view taken along the line 41—41 of Fig. 35;

Fig. 42 is a side-elevational view of a sheave and hanger illustrating a further embodiment of the invention;

Fig. 43 is a sectional view taken along the line 43—43 of Fig. 42.

Figure 24:
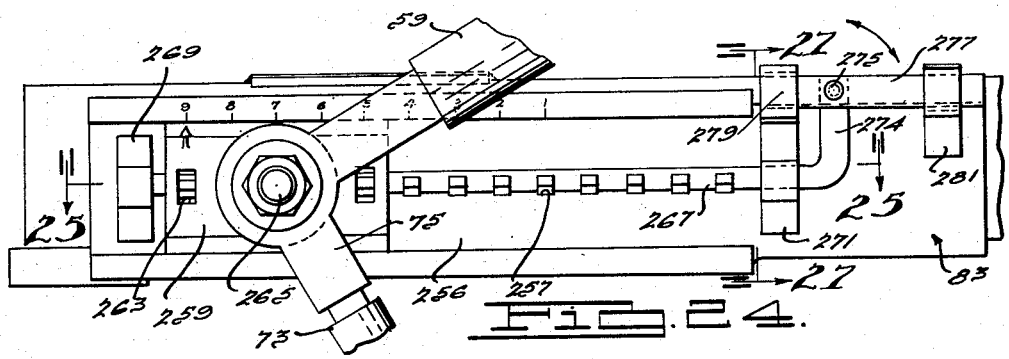
Fig. 24 is a side-elevational view of a further embodiment of a sliding hub mechanism.
Figure 25:
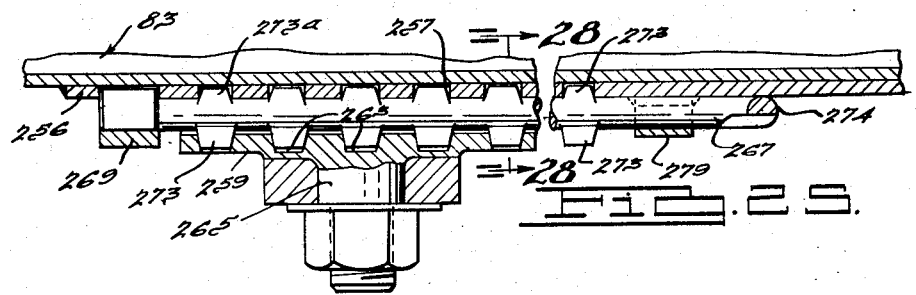
Fig. 25 is a sectional view taken along the line 25—25 of Fig. 24.

Referring now to the drawings, Figure 1 illustrates one end section of a conventional freight car, having a floor 45, an end wall 47, and a roof 49, all partially shown in section. The illustrated end section is equipped with the present loading frame, and it will be understood that the other end section (not shown) would normally be similarly equipped.

The present loading frame is indicated generally at 55, and is supported within the freight car by two pairs of front and rear swinging arms or rods connected adjacent to the four corners of the frame, and two pairs of front and rear legs. Fig. 1 illustrates the rods for one side of the frame, including the front rod 57 and a rear rod 59, and like supporting members are located on the opposite side of the frame. Similarly, the legs at one side of the frame are designated 71 and 73, and the other side of the frame is similarly equipped. The front rods 57 are pivotally connected to the front end of the frame as at 58, while the rear rods 59 are pivoted to a trunnion member 61 carried by an adjustable plate 63, to be described later in detail. The upper ends of arms 57 are pivoted to the side walls of the car, as indicated at 52, and arms 59 are pivoted to the car roof as indicated at 51.

Each rear strut 73 is connected to the frame by means of an L-shaped connector member 75, which also connects the corresponding arm 59 to the corresponding trunnion 61. Each front strut 71 is pivotally connected to the front end of the frame 55 as will hereinafter be described in detail. When not in use the struts are released from the floor and the front struts 71 are stowed in the frame as will be hereinafter described and the rear struts 73 are swung upwardly and connected to the upper arms 59. A releasable connection is provided between each strut and the floor of the car, such as described in detail in Patent No. 2,164,661, issued July 4, 1939, to Sulo M. Nampa and assigned to the assignee hereof.

As thus far described, the present organization and its mode of operation are the same as that of various prior patents assigned to the assignee of the present invention, Butterworth Patent No. 2,079,930, granted May 11, 1937, being an example. A brief description of the general mode of operation will, therefore, be sufficient for the purposes of the present application. In the position shown, the weight of the frame 55 and the vehicle carried thereby, is borne by the front and rear pairs of struts 71 and 73, and by the front and rear supporting and adjusting arms 57 and 59. Alternatively, if desired, a part of the load may be borne by the pair of oppositely disposed elevating cables 65, which are anchored to the side frame members by anchor plates 69, and which cables are trained over sheaves 67 and 70, which are associated with a usual chain fall 70a. In accordance with more usual practice, however, chain fall 70a is partially slacked off so that the cables 65 while being relatively taut do not carry any substantial part of the load.

By releasing the legs 71 and 73, as described below, the frame may be lowered from the semidecking position shown to the loading position, in which the frame 55 rests directly upon the car floor, and from which position, after release of the usual hold-downs 27 and 127, the vehicle may be driven off of the frame 55. During this lowering movement, arms 57 and 59 swing with respect to the freight car, about their respective pivots 52 and 51, and swing with respect to the frame about the associated pivots 58 and 61. These arms, therefore, determine the path of movement through which the frame moves.

In elevating the frame to the semidecking position, an opposite but analogous action, of course, occurs, and this elevating movement is conventionally interrupted when the pivotal movement of arms 57 with respect to the frame 55 is interrupted by the engagement of these arms with frame carried hooks 169, one whereof is carried by the frame at each side thereof (Fig. 12). With the frame in this position, the struts 71 and 73 may again be placed in operative position, as described in more detail below, and the cables 65 may be slightly slacked off, as described below.

For stowage purposes and further in accordance with the aforesaid patent, the frame 55 may be elevated to a position in which it lies immediately below the roof and in a horizontal position. To permit this, the rear arms 59 are made telescopic, as is described in more detail below, thereby permitting the upward swinging movement of the frame 55 to be continued after arms 57 engage the hooks 169. During this continued swinging movement, arms 59 become progressively shorter and the entire assembly swings about pivots 52 as a center.

In the position shown in Fig. 1, the two telescopic sections of the rear rod 59 have reached the limit of their extensibility and hence the disposition of telescopic rods supports the rear end of the loading frame by tension. However, when the frame is elevated further into position adjacent to the roof, these two telescopic sections slide one upon the other to shorten their effective combined length. In order to support the frame 55, when in a horizontal position adjacent to the roof of the car, a pair of hook members 79 are provided.

Fig. 2 is a plan view of the automobile loading frame 55 and it includes a pair of longitudinal side rails 83 which extend the entire length of the frame. Heretofore all such automobile loading frames have had the side rail sections interrupted to receive the wheel pans, but as can clearly be seen in Fig. 2, and subsequent figures, the side rails 83 of this embodiment extend uninterruptedly throughout the entire length of the frame.

The opposite sides of the front and rear halves of the frame 55 are identical in construction and accordingly therefore only one half of the rear section and one half of the front section of the frame 55 will be described in detail with corresponding numbers being given to similar parts on the opposite side of the respective front and rear sections. Details of the rear section, which supplement Figs. 1 and 2, are shown in Figs. 3 through 9.

As can be seen in Fig. 3 and Fig. 4, which show a portion of the rear half of the frame 55, each side rail 83 is of a triangular box structure and the innermost leg 85 is inclined so as to guide the wheels of an automobile when loaded thereon before the wheels are engaged in the wheel pan. The outer leg 84 of the side rail is shown as being vertical and the bottom leg 86 extends horizontally between the lower ends of the inclined leg 85 and the vertical leg 84. The rear ends of the laterally opposite side rails 83 are tied together by a lateral cross beam 87 which is secured to the under side of the opposed side rails by welding or the like. Within each hollow triangular side rail 83, an L-shaped reinforcing member 89 is secured, to reinforce the outer and lower legs of the side rail 83.

Secured to the outer surface of the leg 84 of each side rail 83 is a channel-shaped guide element generally indicated at 93. The upper and lower portions of each guide member 93 are looped outwardly as at 95 to slidably receive the adjustable plate 63 previously mentioned, which in turn supports the trunnion 61 for pivotally mounting the corresponding rods 59 and 73. The guide element 93 is provided in the center of the web portion thereof, with a plurality of longitudinally spaced apertures 97, and the adjusting plate 63 is provided with five apertures 99 in the center thereof which are of the same shape and size as the guide apertures 97 and which are spaced the same distance apart as are the guide element apertures 97. Thus when the adjusting plate 63 is slidably mounted in the guide element 93 the adjusting plate apertures 99 will be aligned with a portion of the guide element apertures 97. The adjustable plate 63 is formed with a central opening 101 extending longitudinally the length thereof and communicating with the apertures 99 and with the guide element apertures 97. Positioned within the opening 101 and extending therethrough is a lock shaft 103 which has five sets of oppositely disposed lugs 105 and 107. The lugs 105 are adapted to be rotated into the apertures 99 formed in the adjusting plate 63 and the lugs 107 are adapted to be simultaneously received in any five of the apertures 97 formed in the guide element 93.

Adjacent the opening 99, the body of the plate 63 is provided with radially inwardly extending ribs or walls 102 which, as shown in Figures 7 and 9, register with the projections 105 and 107, in both the locked and released positions of the lock shaft 103. Thus, substantial lengthwise movement of the lock shaft 103 relative to the plate 63 is prevented. It is to be understood that in assembly, the lock shaft 103 is placed in the plate opening 101, turned to the position shown in Figure 9, and thereafter the plate 63 and the lock shaft, as a whole, are slid into place within the channel-shaped guide element 93.

It is to be noted also that the projections 105 and 107 are identical and are symmetrically arranged. This enables a single design of lock bar to be used in both left and right-hand positions. That is, to be used at both sides of the loading frame.

The rear end of the lock shaft 103 extends outwardly beyond the end of the adjusting plate 63 and has an arm element 109 extending upwardly at right angles thereto. Turnably mounted on the arm portion 109 is a lever element 115 which is pivotally secured to the arm portion 109 by a pivot pin 117 which passes through an opening 119 in the lever 115 and has the inner end thereof threaded into an opening 111 in the arm 109. It will be noted that the lever 115 is provided with an indented portion 121 adapted to receive a spring pressed ball 113 carried by arm 109 so that when the lever 115 is turned so to be aligned with the arm 109, the spring pressed ball 113 will engage the indented portion 121 and secure the arm and lever together. It likewise will be noted (Fig. 5) that the lever 115 extends outwardly beyond the arm 109 at the top and bottom so as to pass over and engage the upper and lower edges of the guide element 93 and prevent rotation of the lock shaft when in such a position.

When it is desired to rotate the lock shaft so as to disengage the lugs 105 and 107 from the guide element and adjusting plate apertures, the lever 115 is rotated about the pivot pin 117, 180° from its normal closed position. Then by applying a pressure to the lever 115 the lock shaft 103 will be rotated as the lever is now swung away from the guide element edges so as to allow this movement. When the lock shaft is so rotated the adjusting plate 63 can be slid along the guide element 93 and a different adjustment of the adjusting plate will thus take place. The lock shaft lugs are then rotated so as to engage the guide element and adjusting plate and the lever 115 is then swung back into alignment with the arm 109 to prevent the lugs from becoming disengaged.

This sliding hub mechanism provides a means for elevating the rear end of the frame 55 with relation to the floor of the freight car to compensate for the size of the automobile thereon and to provide more effective loading in the freight car of various sizes of automobiles.

As seen in Figs. 2 and 4, inwardly spaced from the opposite side rails 83 on the frame 55 are a pair of channel-shaped supporting beams 123, which are secured at their outer ends on the upper surface of the flat cross beam 87. Abutting the inner edges of the top and bottom flanges of the beams 123, and secured thereto, is a laterally extending chain pan 125, the rear portion of which is positioned on top of the flat cross beam 87 and secured thereto. This chain pan 125 is of a rectangular box shape and adapted to receive for storage purposes the previously mentioned chain 127, which secures the rear axle of the vehicle to the rear end of the frame.

As can be seen in Fig. 3 secured to the under side of each side rail 83, forwardly of the rear end thereof and extending diagonally therefrom, is a bracing member 129, which passes beneath and supports the corresponding supporting beam 123, as well as the chain pan 125, and abuts against the forward edge of the cross beam 87. The chain pan 125 is provided with an opening 131 in the bottom wall thereof for allowing the diagonal brace 129 to be suitably welded thereto, and to the cross beam 87. Secured intermediate the ends of each diagonal brace 129 and extending at right angles therefrom is a second bracing member 133 which extends diagonally rearwardly from the diagonal brace 129 and is secured to the under side of the corresponding side rail 83 rearwardly of the point of securement of the diagonal brace 129.

Positioned between each side rail 83 and its longitudinal beam 123, and supported on the bracing members 129 and 133, is a wheel pan generally designated at 134. Each wheel pan 134 has a flat central portion which receives the wheels of the vehicle and adjacent its outer edge is bent upwardly to form a side wall 135 which is inclined at the same angle as the inclined inner leg 85 of the side rail. The inclined side wall 135 of the wheel pan is slidably secured to the leg 85 by means of a pair of retaining brackets 137 welded to the top of the side rail 83 and extending over the upper edge of the inclined side wall 135 to allow the wheel pan to slide relative to the side rail but not move laterally with respect thereto.

Each longitudinal supporting beam 123 has an angle member 139 welded or otherwise suitably secured to the upper end of the web portion thereof. Each wheel pan 134 has an inner inclined side wall 141, which is bent at the upper end thereof to form a horizontal flange 143 which slidably engages the member 139 to support and guide the inner end of the wheel pan during any sliding adjustment of the latter. It will be noted by referring to Fig. 4 that an L-shaped reinforcing member 145 has the upper end of its vertical leg secured to the under side of the horizontal flange 143 of the wheel pan adjacent the edge thereof. The end of the horizontal leg of the member 145 is secured to the inner surface of the inclined side wall 141 of the wheel pan, adjacent the lower end thereof. This reinforcing member 145 extends longitudinally from the front end of the wheel pan to a point beyond the center thereof and is provided with a plurality of longitudinally spaced apertures 147 therein for a reason which will be hereinafter brought out.

As can be seen in Fig. 4, a channel-shaped member 148 is secured between the inner ends of the flanges of each longitudinal channel beam 123. Each channel member 148 has an opening in the web portion thereof which receives therethrough a lock shaft 149 which extends therefrom through an aligned opening in the web portion of the longitudinal beam member 123 into one of the apertures 147 formed in the L-shaped reinforcing member 145 for the wheel pan. The lock shaft 149 has an annular collar 151 secured thereto adjacent the web portion of the beam 123 and a coil spring 153 surrounds the lock shaft 149 and its outer end abuts the collar 151 and its inner end abuts the outer surface of the web portion of the channel member 148 so as to urge the lock shaft 149 into the apertures 147. As seen in Fig. 3, the inner end of the lock shaft 149 is provided with a handle 155 which extends on opposite sides of the lock shaft 149 at right angles thereto, and one end of which is return bent 90° to form an arm 157. The end of the arm 157 is bent rearwardly 90° and then return bent to provide a shoulder 159 which is adapted, when the lock shaft 149 is pulled out of engagement with the wheel pan reinforcing member 145, to engage the upper leg of the beam 123 and hold the lock shaft out of engagement with the wheel pan member 145.

In this way each wheel pan may be unlocked so as to be slidably adjusted along the frame by a single operator and when it is adjusted to the proper location the operator can turn the handle 155 so as to release the shoulder 159 from the beam member 123, and the spring will urge the lock shaft 149 into engagement with the aligned aperture 147 on the wheel pan. This type of lock allows a single operator to adjust the wheel pans.

It will be noted that a closed chain rod 161 is provided for securing each chain 127 to the frame. Each chain rod 161 extends forwardly from the rear end of the frame and has vertically depending legs 163 which pass through the flanges of the beam member 123 and are welded or otherwise secured thereto.

The plan view of one half of the front portion of the frame 55 is illustrated in Fig. 10, and details thereof are shown in Figs. 11 through 20. While only one half of the front portion of the frame will be described, it will be understood that similar numbers are to be applied to the other half of the frame as the construction thereof is identical with the half about to be described. The front end of each side rail 83 is welded to a lateral cross beam 165 which extends below the side rail 83 and across the front end of the frame. Rearwardly spaced from the cross member 165 is an arch bar 167 which extends across the frame and is welded at opposite ends to the side rails. Braces 171 interconnect the rails 83 and the arch bar 167. The center portion of the bar 167 is arched upwardly so as not to interfere with an automobile placed below the frame when the frame is in a semidecked position in the freight car. The outer end of the arch bar 167 is inclined arcuately upward to form the previously mentioned hooks 169. Thus, when the frame is in either a horizontal stowed position adjacent to the roof of the car or in the semidecking position as shown in Fig. 1, each front arm 57 will rest between the outer portion 169 of the arch bar and the corresponding side rail 83 and give additional support thereto.

Slidably positioned on the arch bar and the cross bar 165 are the front wheel pans 173, which are similar in construction to the wheel pans 134 described for the rear end. Each wheel pan 173 has an outer inclined side wall 175 which is slidably connected to the inclined front leg 85 of the side rail 83 by brackets 177 which are secured to the top of the side rail 83 and extend downwardly over the top of the inclined side wall 175 to maintain the wheel pan in a sliding relation to the side rail 83. The opposite side of each wheel pan 173 extends upwardly in an arcuate manner to form an inclined side wall 179, the upper end of which terminates in a horizontal flange 180. An L-shaped reinforcing member 181 is secured to the under side of the horizontal flange 180 and to the inclined end wall 179 adjacent the lower end thereof.

Adjacent the vertical leg of the reinforcing member 181, is a vertical longitudinally extending plate 183 which has its lower edge welded to the cross members 165 and 167 and has its upper edge bent over away from the wheel pan to form flange 187. Positioned inwardly of the plate 183 is a second plate 189 the lower edge of which is similarly welded to the cross beams 165 and 167 and the upper edge of which is bent over toward the wheel pan to form flange 191, which opposes the flange 187 on the adjacent plate 183. The plates 183 and 189 are tied together by means of a horizontal plate 190 which stops short of the front ends of the members 183 and 189, but extends to the rear ends thereof, as can be seen in Figs. 10, 11, and 19.

The inner end of the horizontal flange 180 of the wheel pan extends over and is positioned on top of the flange 187 of the plate 183. An adjustable chain rod supporting member indicated at 193 is formed with a pair of oppositely disposed longitudinal grooves 195, one whereof slidably receives the flanges 180 and 187 and the other whereof slidable receives the flange 191. The chain rod itself, indicated at 197, is similar in shape to the chain rod previously described for the rear end. The forward leg 199 of the chain rod 197 depends vertically therefrom and extends through the chain rod supporting member 193 and is secured thereto by a nut 201 threaded on the lower end of the vertical leg 199. The opposite end of the chain rod has a horizontal leg 203 formed thereon which is welded to the under or upper side of the chain rod supporting member 193 to secure the rear of the chain rod to the member 193. As can be seen in Fig. 13, the lower ends of the plates 183 and 189 taper upwardly at the rear end thereof and are connected to the arch portion of the arch bar 167 by welding or the like as at 205.

The flange or shoulder 196 of the chain rod supporting member 193 which rides on the flange 191 of the plate 189, is provided with a plurality of longitudinally spaced notches 207 and the front and rear ends of the flange 196 are provided with projecting tabs 209 for use as stop means as will be hereinafter described.

As can be best seen in Figs. 14–17, secured to the side of the plate 189 rearwardly of the front end thereof, are a pair of bearing elements 211 which support a longitudinal pin 213 which in turn pivotally supports a lock element generally indicated at 215. As can be seen in Fig. 15, the lock element 215 is of a generally Y shape and comprises an inclined handle portion 217 and an arcuate latch portion 219 adapted to be received in the notches 207 in the chain rod supporting member 193. Below the junction of the handle portion 217 and the latch portion 219 each side of the lock element 215 is stepped down as at 221. Adjacent the lower end of each stepped down portion a pair of annular hubs 223 are formed and a horizontal aperture 225 extends through the center thereof. The pin 213 is received in the opening 225 to pivotally mount the lock element 215 on the plate 189 and a coil spring 227 is looped around one of the hubs 223 with one end thereof abutting the plate 189 as at 228 and the other end thereof abutting the upper end of the cut-off portion 221. The spring is placed under compression so that it will normally urge the lock element 215 into engagement with the recesses 207 formed in the chain rod supporting member. The bottom face of the lock element which abuts the side of the plate 189 is formed with a projecting portion 229 which acts as a stop for the lock element as will be hereinafter described.

In order to allow the latch portion 219 of the lock element 215 to engage the recesses 207, the flange 191 of the plate 189 is cut out intermediate the ends thereof, as can be seen in Fig. 14, so as not to interfere with the lower end of the latch portion 219 when it swings into engagement with the recesses 207. When it is desired to adjust the chain rod for different sized vehicles which may be mounted on the loading frame 55, the lock element 215 is swung away from the chain rod supporting member against the action of the spring 227, so as to disengage the latch portion 219 from the chain rod supporting member. The lower end of the lock element 215 will move toward the plate 189 and the stop 229 will abut thereagainst to prevent any further clockwise movement of the lock element. The stop 229 is constructed so that the lock element 215 can be swung outwardly only far enough to allow the latch portion 219 to become disengaged from the recesses 207, and so that if the chain rod supporting member 193 is moved too far, the projecting tabs 209 previously described thereon will abut against the end of the latch portion 219 and prevent the chain rod supporting member 193 from sliding off the loading frame.

As seen in Figs. 18–20, secured to the vertical plate 189 and to the cross beam 165 and extending inwardly from the plate 189 is a rectangular box-shaped chain pan 230 for chain 27 similar in construction to the chain pan 125 previously described for the rear end of the loading frame. The front vertical wall 231 of the chain pan 230 is provided with a horizontal slot 232 extending inwardly from the plate 189. The inner end of the slot 232 terminates in a short vertical slot 233. Positioned between the vertical plates 189 and 183 is a shaft 234 which is slidably received in an aperture 235 in the member 189. Adjacent the outer end of the shaft 234 an annular collar 236 is formed, which abuts against the member 183 when in the position shown in Fig. 18. Outwardly of the collar 236 the shaft 234 passes through an aperture 237 in the member 183 and through and into one of a plurality of longitudinally spaced apertures 238 formed in the vertical leg of the reinforcing member 181 which is secured to the wheel pan 179. Surrounding the shaft 234 and having one end thereof abutting the collar 236 is a helical spring 239, the inner end of which abuts against the member 189. The inner end of the shaft 234 is provided with a handle comprising a horizontal handle portion 240 extending forwardly from the inner end of the shaft 234 and the outer end of the handle portion 240 is bent upwardly at right angles to form a vertical handle portion 241. The horizontal handle portion 240 is positioned within the horizontal slot 232 of the chain pan and the vertical portion 241 extends forwardly of the wheel pan outer wall 231 far enough to allow it to be grasped by an operator. When it is desired to adjust the wheel pan 179 with respect to the loading frame side rails, the vertical handle portion 241 is grasped by the operator and pulled inwardly thus disengaging the shaft 234 from the wheel pan reinforcing member 181. In order to lock the shaft 234 out of engagement with the wheel pan, the vertical handle portion 241 is rotated clockwise, when aligned with the vertical slot 233, and the horizontal handle portion 240 then becomes engaged in the vertical slot 233, as can be seen in Fig. 20. It can thus be seen that the shaft 234 will be held out of engagement with the wheel pan so that a single operator can then adjust the wheel pan without holding the latch out of engagement therewith. When it is desired to re-engage the shaft 234 in one of the apertures 238, the vertical handle portion 241 is rotated counterclockwise so as to move the horizontal portion out of the vertical slot and the spring 239 then moves the entire lock mechanism forwardly to engage the wheel pan once again.

As was previously noted, each front strut 71 for the loading frame is connected to the front end of the associated side rail 83, by a "ball and socket" structure, which also permits the strut to be stowed in the frame when not in use.

Referring particularly to Figures 21 and 22, the upper end of each strut 71 is provided with a connecting member designated generally as 245, which comprises a reduced neck 246, and a head 247. In the operative position shown in these figures, as well as in Figure 1, in which the illustrated strut 71 depends from the frame 55, the reduced neck 246 is received and guided within a slot 251 formed in the lower leg 86 of the side rail 83. The rounded base of the head 247 is wider than this slot and, consequently, the strut 71 cannot be drawn downwardly out of the rail 83. The outer end 248 of the head 247 is a section of a cylinder, being arcuate as seen in Figure 21. Moreover, the outer end of the rail 83 is provided with a socket member 242, permanently secured in place thereon as by the hole welds 243. The lower face 244 of the socket member 242 is formed as a section for a cylinder, having a radius equal to that of the head surface 248. When the frame is in the semidecking position shown in Figure 1, the weight of the frame is transmitted through the interengaged faces 244 and 248, and it will be apparent that strut 71 can swing in a counterclockwise direction from the position shown in Figure 21 through quite a substantial angle and still maintain this ball and socket like bearing engagement between surfaces 248 and 244. At the same time any substantial rocking of the strut 71 relative to the rail, in the plane of the paper, as viewed in Figure 22, is prevented by the cylindrical form of the surfaces 244 and 248 and by the fact that the inner end of the head lies immediately adjacent the lower leg 86 of the rail 83.

In stowing each strut 71 in its associated rail, the lower end thereof is released from the freight car floor and the strut is then swung counterclockwise, as viewed in Figure 21, to a position in which the axis of the strut lies parallel with the axis of the rail. The side faces 249 and 250 of the head 247 are flattened as seen in Figure 21 and the spacing therebetween is less than the spacing between the lower rail leg and the rear surface 244a of the socket member 242. Consequently, the strut may be readily pushed into the rail 83. On the other hand, while the spacing between the rail leg 86 and the front edge 244b of the socket member 242 is greater than the diameter of the strut 71, it is less than the space between the flat surfaces 249 and 250. Consequently, though the strut can be pushed into the rail, it cannot be withdrawn therefrom through the aperture at the end of the rail. In this connection, it will be understood that in assembly, the strut is pushed into the rail 83 and thereafter the socket member 242 is welded in place.

The side faces 247a of the head 247 are also flattened and are inclined towards each other and the spacing therebetween is substantially less than the lateral spacing between the rail legs 84 and 85. Thus, the head 247 freely moves along in the body of the rail. On the other hand, the head 247 is too large to permit rotation of the head about the axis of the strut, within the body of the rail. Accordingly, though the strut can be freely moved lengthwise of the rail and can be swung between the stowing and operative positions when the slot 251 is encountered, it cannot be bodily rotated within the rail. By virtue of this arrangement, the strut is always in the proper rotative position for use.

As can be seen in Figs. 1 and 23, the lower end of the strut 71 is provided with an adjusting mechanism 252 which is of a larger diameter than the strut and larger than the aperture formed at the end of the rail 83, so that when the strut is pushed back through the side rail 83, the adjusting mechanism 252 projects outwardly of the side rail 83. This adjusting mechanism 252 is collapsed to its shortest length when in this stowing position, so as to provide the minimum possible extension beyond the side rail 83. In order to prevent the strut 71 from sliding out of the end of the side rail when stowed therein, a rod 253 is provided, the rear end of which is pivotally connected in the block 242 in the side rail, and the forward end of which is bent downwardly and then forwardly again, as at 254, and provided with an indentation to engage a pin 255 on the forward end of the adjusting mechanism 252. In this manner, the strut 71 is releasably held in position within the side rail 83 when it is stowed therein.

Figure 26:
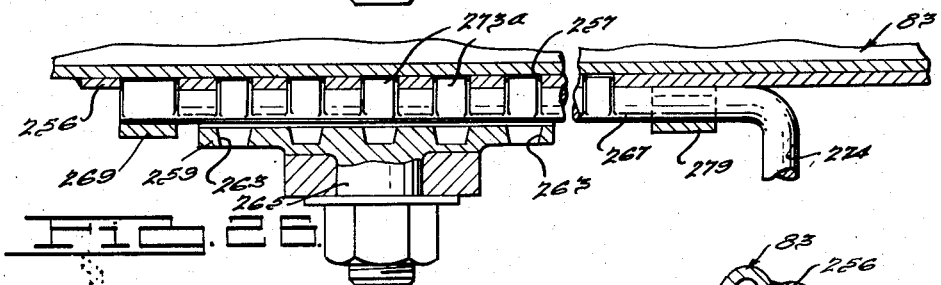
Fig. 26 is a sectional view of the structure illustrated in Fig. 25 with the lock handle rotated 90° from that shown in Fig. 25.
Figures 27, 28:
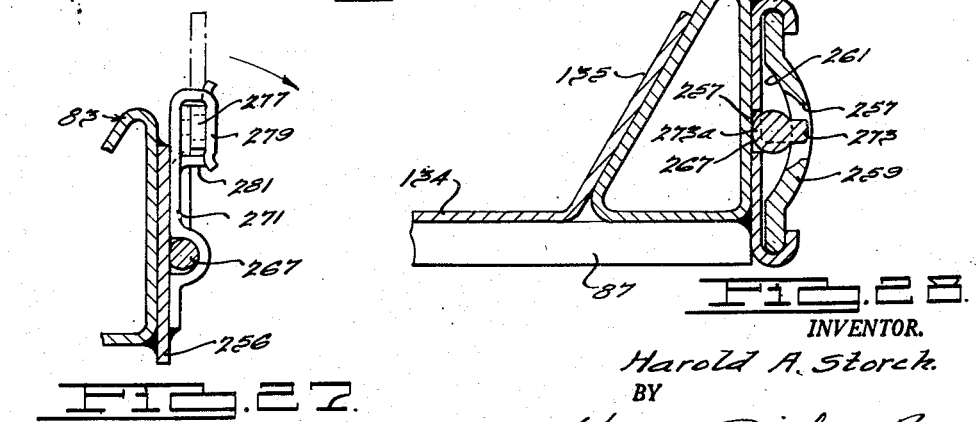
Fig. 27 is a sectional view taken along the line 27—27 of Fig. 24.
Fig. 28 is a sectional view taken along the line 28—28 of Fig. 25.

Figures 24 through 29 show a further embodiment of a sliding hub arrangement for use on the loading frame previously described. A channel-shaped guide member 256, similar to the channel guide member 93 in the previous embodiment, is similarly secured to the side rail 83 adjacent the rear end thereof. The guide member 256 is similarly provided with a plurality of longitudinal apertures 257 along the center of the web thereof. An adjusting plate 259, generally similar to the adjusting plate 63 described for the previous embodiment, is slidably received and retained in the guide element 256. The adjusting plate 259 is formed with an arcuate center portion which provides a chamber 261 between the guide element and the body of the adjusting plate 259, as can be seen in Figure 28. The adjusting plate 259 likewise is provided with a series of recesses 263 which are of the same size and shape as the recesses 257 for the guide element and which are also similarly spaced. The adjusting plate 259 carries a trunnion 265 in the center of its outer surface for mounting the rear leg 59 and rear strut 73, as previously described for the first embodiment.

Extending through the chamber 261 between the guide element and the adjusting plate is a lock shaft 267, the rear end of which is rotatably mounted in a bearing member 269 which in turn is rigidly mounted on the outer face of the guide element 256 adjacent the rear end thereof. Adjacent the forward end of the guide element 256, and secured thereto, is a second bearing element 271 which rotatably supports the forward end of the lock shaft 267.

Intermediate the brackets 269 and 271, the lock shaft 267 is provided with a plurality of longitudinally spaced lugs 273 adapted to engage the apertures 263 in the adjusting plate, and a similarly spaced set of ring-like projections 273a formed on the opposite side of the shaft by enlarged shaft portions adapted to be received in the guide element apertures 257 simultaneously with the engagement of the lugs 273 in the adjusting plate apertures, to lock the adjusting plate to the side rail in a desired position. When it is desired to slide the adjusting plate along the guide element, the lock shaft 267 is rotated 90° to disengage the lugs 273 from the adjusting plate and position them within the hollow opening 261, while the projections 273a remain in engagement with the guide element apertures at all times, and thus serve to prevent lengthwise movement of the lock shaft relative to the guide element 256, as can be seen in Fig. 26. The adjusting plate 259 can then be slid longitudinally along the guide element 256 to a desired position. The bearing brackets 271 and 269 act as stops to limit the forward and rear movement of the adjusting plate 259.

When the lock shaft projections and lugs are engaging both the guide element and the adjusting plate, it is necessary to lock the shaft in this position to prevent it from rotating out of its locking position and allowing movement of the adjusting plate with respect to the guide element. Therefore, the forward end of the lock shaft 267, forwardly of the bracket 271, is bent upwardly at right angles as at 274, and pivotally connected to the upper end of the upwardly extending portion 274, by means of a pivot pin 275, is a flat bar member 277. The upper end of the bracket 271 is return bent to form a clip portion 279, the lower end of which is open to receive the rear end of the bar 277. Forwardly of the clip portion 279 is a second clip 281, which is secured to the side rail 83 and which is open at its upper end so that the bar 277 can be pivoted to have its rear end enter the lower end of the clip portion 279 and its forward end enter the upper end of the clip 281. In this way the lock shaft is prevented from rotating and is secured in a locked position to prevent any slippage between the adjusting plate 259 and the guide element 256.

Figs. 30–41 illustrate a further embodiment of the arrangement for stowing the front struts 71 within the side rails 83. In this form, each triangularly shaped, hollow, side rail 83, has a complementally shaped bearing block member 285 secured between the vertical leg 84 and the inclined leg 85 adjacent the upper end thereof by suitable means such as hole welding, as indicated at 287. The bearing block is provided with an arcuate recess 289 in its lower surface which forms a cylindrical socket for the upper end of the strut, as will be hereinafter described. The front end of the socket or recess 289 blends into a front vertical wall 290 of the bearing block. This front wall extends downwardly farther than the block rear wall 292 so that the distance between the lower leg 86 of the side rail 83 and the bottom edge of the block front wall 290 is less than the distance between the bottom edge of the rear block wall 292 and the lower leg 86 for a reason which will be hereinafter brought out. Below and aligned with the recess 289 in the bearing block, the lower leg 86 of the side rail 83 is provided with a longitudinal slot 291 which extends rearwardly from the front end thereof and is similar to the slot 251 in the previous embodiment.

The upper end portion of each front strut 71 is recessed to define a reduced elongated neck 293, which when the strut is in an operative position (that is, secured to the floor of the freight car), will pass through the slot 291 in the lower leg of the side rail 83. Beyond the neck 293, the end of the strut is enlarged to form a ball head generally indicated at 295. The top 297 of the head 295 is complementally shaped, as a section of a cylinder, to be received in the bearing block socket 289 and be rotatable therein.

The size of the head as viewed in Figs. 30 and 33 exceeds the size of the aperture in the end of the rail 83, and prevents withdrawal of the head through this aperture when the strut is in operative position.

The base 299 of the head 295 is in end elevation of a generally truncated triangular shape, as can be seen in Fig. 34, and of such a size that the ball head portion cannot be pulled down through the slotted recess 291 in the bottom leg 86 of the side rail either in the supporting or stowed positions. Likewise, as will hereinafter be brought out, the base 299, when the strut is parallel with the rail, is of such size and shape that it cannot be pulled outwardly through the front end of the aperture formed between the bottom leg of the side rail and the lower front wall 290 of the bearing block 285, but can be pushed back in the side rail, and will clear the bottom edge of the rear wall 292 of the block 285. Additionally, the generally trapezoidal shape of the head, as viewed in Figs. 34 and 35, prevents the strut 71 from being rotated about its axis relative to the side rail when in the stowed position.

Figure 38:
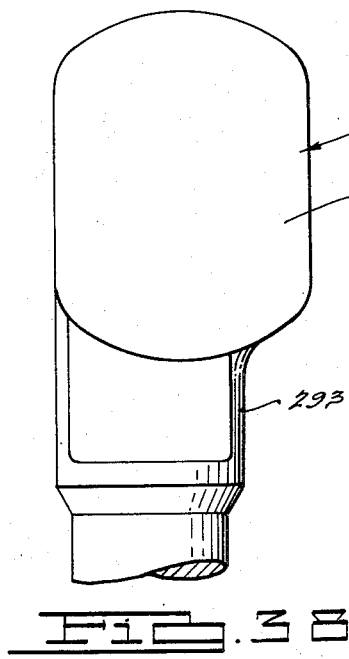
Fig. 38 is a side-elevational view of the structure illustrated in Fig. 37 taken in the direction of the arrow 38 thereon.
Figure 35:
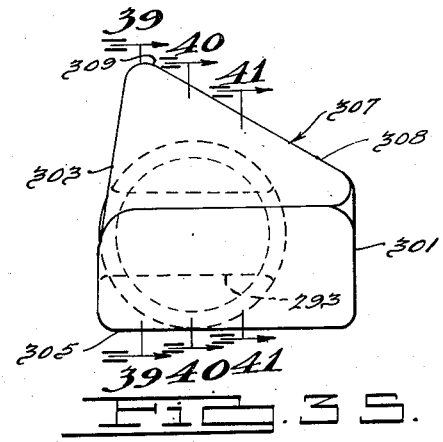
Fig. 35 is a top plan view of the ball head portion in detail.

The front face 301 and the rear face 303 of the head 295 are substantially flat and parallel to each other and extend upwardly substantially normal to the base 299, as can be seen in Fig. 31. The left face 305 of the head 295, as seen in Figs. 33 and 38, is substantially flat and extends normal to the front and rear faces of the head. This left face 305 is positioned adjacent the vertical leg 84 of the side rail 83.

Figure 36:
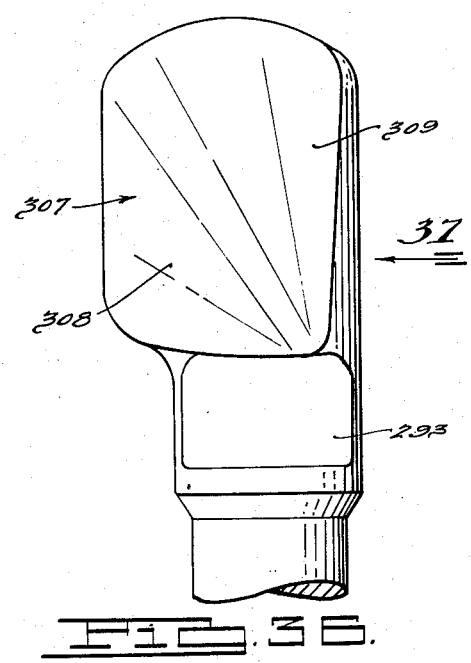
Fig. 36 is an elevational view of the right side of the head portion shown in Fig. 35.
Figure 37:
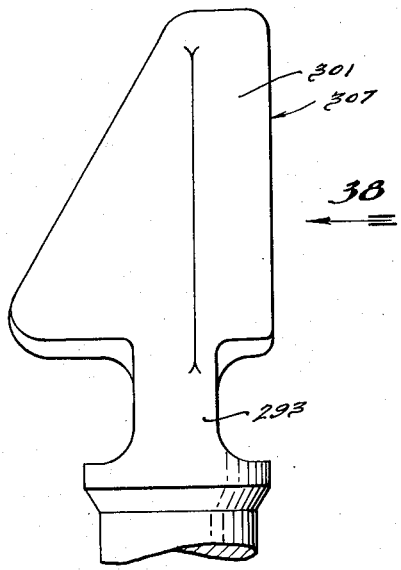
Fig. 37 is an elevational view of the structure illustrated in Fig. 36 taken in the direction of the arrow 37 thereon.

The right face 307 of the head 295, illustrated in elevation in Fig. 36, is presented to the inclined leg 85 of the side rail and has a triangular portion 308 adjacent the base 299 which is inclined complementally to the inclined leg 85 of the side rail when the strut and side rail are in parallel axis relation. The right face 307 is cut back from the portion 308, as can be seen in detail in Figs. 39–41 to provide a second triangular portion 309 complementally inclined to the inclined leg 85 of the side rail when the strut is swung to an active position, at a substantial angle to the side rail. The inclined face portion 309 is cut back in such a relation to the inclined portion 308 that the right face 307 will clear the side rail leg 85 when the strut is swung from the stowed position to the active position, or vice versa.

By developing the head portion 295 in the manner previously described and illustrated in the drawings, the aperture formed between the lower edge of the bearing block 285 and the lower leg 86 of the side rail 83 is larger than the aperture formed in the previous embodiment, and allows the strut 71 as well as the adjusting mechanism 252 to be completely stowed within the side rail 83 as illustrated in Fig. 32.

As can be seen in Figs. 31 and 32, a tab 311 is provided which extends forwardly from the front surface of the bearing block 285 and is secured thereto by suitable means such as welding or cast as a part of the block 285. The tab 311 is provided with a horizontal aperture 313 through the center thereof which receives a bolt 315 therethrough. Pivotally mounted on the bolt 315, and secured thereon against the side of the tab by a nut 317, is an inverted L-shaped latch element 319, the lower end of which is adapted to be swung into an elongated opening 321 in the lower end of the strut adjusting mechanism 247 to lock the strut in the stowed position, as shown in Fig. 32.

In this way, it will be seen that the strut can be swung from a stowing position to an active position due to the developed surfaces formed on the strut head portion 295, and also due to the arrangement of the socket and the head portion the strut can be completely stowed without having the lower adjusting portion 252 thereon projecting forwardly of the side rail 83, as resulted in the previous embodiment.

Figs. 42 and 43 illustrate an improved type of sheave hanger, and method for mounting the same to the roof of the freight car, over which the loading frame lifting cable 65 passes. The sheave hanger for only one side of the freight car is illustrated in the drawings and, as can be seen therein, a pair of brackets 323, secured to adjacent roof carlings 325, have a channel-shaped supporting element 327, which extends therebetween, secured thereto by welding, bolting or other suitable means. In order to support the sheave indicated at 329, a pair of generally triangularly shaped flat plates 331 are provided which have an aperture 333 adjacent the lower or apex end thereof, which receives a pin 335 therethrough which in turn rotatably mounts the sheave 329 thereon between the two plate elements 331. In order to properly locate the sheave and hanger so that there will be a straight line rise of the cable portion between the frame and the sheave, that is, so as to get the full height of the frame lifting movement it is necessary to be able to adjust the position of the sheave and sheave hanger fore and aft along the U-shaped supporting element 327. This can be done by using the frame as a jig and sliding the sheave hanger plates 331 forwardly and aft along the element 327 until the cable is in a position to obtain the straight line cable rise when lifting the frame. The sheave hanger plates 331 are then welded to the inner side of the U-shaped member 327, as can be seen in Fig. 43. In this way, a simple and accurate means of locating the sheave is provided and certain mounting difficulties which have heretofore been presented are simply and easily eliminated.

Certain features not claimed herein are disclosed and claimed in my copending divisional application, Serial No. 318,008, filed October 31, 1952.

While several embodiments of this invention have been illustrated and described it is to be understood that it is not to be restricted thereto, and that it is intended to cover all modifications thereof which will be apparent to one skilled in the art and which come within the spirit and scope of the appended claims.

I claim:

1. Adjustable connecting structure for use in vehicle loading structure of the type comprising a vehicle supporting frame adapted for movement between loading and semidecking positions and further employing one or more frame supporting arms swingably connected to the frame by means of such connecting structure, said connecting structure comprising a first vertical guide member adapted for permanent securement to said frame, a second vertical guide member slidable along the first guide member and provided with means defining a pivotal mounting for a said arm, one of said members being of channel shape and the other said member being telescopically received therein so as to enable sliding movement therebetween in a plane substantially normal to the axis of said pivotal mounting but so as to prevent any substantial relative movement therebetween in a direction parallel to said axis, and locking means acting and substantially housed between the web of said channel-shaped member and the body of the other member for locking said members together in any one of a plurality of adjusted positions.

2. The structure of claim 1 wherein said web and said body are each provided with a plurality of selectively registerable recesses and wherein said locking means is an elongated shaft having a plurality of locking projections disposed to enter said recesses, said shaft being rotatable to bring said projections into and out of said recesses whereby to prevent or permit said sliding movement.

3. The structure of claim 1 wherein said locking means is an elongated shaft which is rockable between locking and unlocked positions, said shaft being provided with an articulated handle having relatively movable portions which in one relative position engage said frame to permit said shaft to be turned to a position permitting said sliding movement and in another relative position hold said shaft in a position in which it prevents said sliding movement.

4. In a vehicle loading structure, for a freight car or the like, and having a frame adapted to support a said vehicle, and frame supporting arm means pivotally connected to the frame, adjustable connecting means between said arm and frame comprising a longitudinal channel-shaped guide element secured to said frame and having a plurality of longitudinally spaced apertures in the web portion thereof, a trunnion element adapted to pivotally connect said arm means to said frame, said trunnion element being slidably supported in said guide element and having a plurality of apertures therein opposed to and spaced similarly to said guide element apertures, elongated locking means rotatably supported adjacent both said guide element apertures and said trunnion element apertures, means formed on said locking means adapted to be simultaneously received in said guide element apertures and said trunnion element apertures to lock said trunnion element to said guide member, said locking means adapted to be rotated out of engagement with at least one of said elements to allow said trunnion element to be shifted longitudinally along said guide element.

5. The structure of claim 4 wherein said locking means is movable with said trunnion element.

6. The structure of claim 4 wherein said locking means is carried by said channel-shaped guide element.

7. In a deck or frame for loading automobiles in freight cars or the like, the combination of a fixed frame member, a slide member slidably mounted and supported on the frame for longitudinal movement relative to the frame member, each of said members having a longitudinal series of openings in their facing surfaces, a shaft between the members journaled in the slide member and capable of longitudinal movement therewith, but not relative thereto, a plurality of radial projections on said shaft adapted to fit simultaneously in a plurality of openings in each of the members to prevent relative longitudinal movement between the members, said projections being movable to operative or inoperative positions upon rotation of the shaft and when in inoperative position being withdrawn from openings in the frame member so that the slide may be moved longitudinally relative to the frame member.

8. In a deck or frame for loading automobiles in freight cars or the like, the combination of a fixed frame member, a slide member slidably mounted and supported on the frame for longitudinal movement relative to the frame member, each of said members having a longitudinal series of openings, in their facing surfaces, a shaft between the members journaled in the slide member and capable of longitudinal movement therewith, but not relative thereto, a plurality of radial projections on said shaft adapted to fit simultaneously in a plurality of openings in each of the members to prevent relative longitudinal movement between the members, said projections being movable to operative or inoperative positions upon rotation of the shaft and when in inoperative position being withdrawn from openings in the frame member so that the slide may be moved longitudinally relative to the frame member, a handle on the shaft whereby it may be manually rotated, a latch member mounted on the handle and engageable with the frame to selectively hold the shaft in a position wherein the projections are operative to prevent relative longitudinal movement between the members.

9. In a deck or frame for loading automobiles in freight cars or the like, the combination of a fixed frame member, a slide member slidably mounted and supported on the frame for longitudinal movement relative to the frame member, each of said members having a longitudinal series of openings in their facing surfaces, at least a portion of said facing surfaces being spaced to provide a longitudinal chamber between the members with said openings being in the surfaces defining opposite walls of the chamber, a shaft in said chamber having rigid radial projections adapted when said shaft is in one position to fit simultaneously in a plurality of openings in each of the members, and when said shaft is in another position to be in said chamber, and means journaling the shaft on the fixed frame member and securing it thereto against longitudinal movement.

10. In a deck or frame for loading automobiles in freight cars or the like, the combination of a fixed frame member, a slide member slidably mounted and supported on the frame for longitudinal movement relative to the frame member, each of said members having a longitudinal series of openings in their facing surfaces, at least a portion of said facing surfaces being spaced to provide a longitudinal chamber between the members with said openings being in the surfaces defining opposite walls of the chamber, a shaft in said chamber having rigid radial projections adapted when said shaft is in one position to fit simultaneously in a plurality of openings in each of the members, and when said shaft is in another position to be in said chamber, and means journaling the shaft on the fixed frame member and securing it thereto against longitudinal movement, a handle on the shaft whereby it may be manually rotated, a latch member mounted on the handle and engageable with the frame to selectively hold the shaft in a position wherein the projections are operative to prevent relative longitudinal movement between the members.

11. Adjustable connecting structure for use in vehicle loading structure of the type comprising a vehicle supporting frame adapted for movement between loading and semidecking positions and further employing one or more frame supporting arms swingably connected to the frame by means of such connecting structure, said connecting structure comprising a first vertical guide member adapted for permanent securement to said frame, a second vertical guide member slidable along the first guide member and provided with means defining a pivotal mounting for a said arm, one of said members being a channel shape and the other said member being telescopically received therein so as to enable sliding movement therebetween in a plane substantially normal to the axis of said pivotal mounting but so as to prevent any substantial relative movement therebetween in a direction parallel to said axis, the web of said channel shaped member and the body of said other member each having a plurality of locking openings therein, and locking means comprising a locking member selectively movable between a locking position in which it locks said members together and an unlocked position in which said guide members can slide relative to each other, said locking member having a plurality of rigid projections which in said locking position project into a plurality of said locking openings in both said web and body to key them together and which in said unlocked position are removed from said locking openings.

References Cited in the file of this patent

UNITED STATES PATENTS

| Number | Name | Date |
|---|---|---|
| 457,999 | McGrath | Aug. 18, 1891 |
| 852,710 | Fletcher | May 7, 1907 |
| 988,807 | Paetz | Apr. 4, 1911 |
| 1,740,382 | Weldon | Dec. 17, 1929 |
| 1,816,897 | Fedderman et al. | Aug. 4, 1931 |
| 1,930,177 | Miller et al. | Oct. 10, 1933 |
| 1,958,962 | Crosby | May 16, 1934 |
| 2,079,930 | Butterworth | May 11, 1937 |
| 2,079,931 | Butterworth | May 11, 1937 |
| 2,164,661 | Nampa | July 4, 1939 |
| 2,164,662 | Nampa | July 4, 1939 |

FOREIGN PATENTS

| Number | Country | Date |
|---|---|---|
| 7,878 of 1932 | Australia | July 27, 1933 |